(12) United States Patent
Chen (10) Patent No.: US 9,482,363 B2
(45) Date of Patent: Nov. 1, 2016

(54) POSITIONING DEVICE FOR KNOB OF VALVE UNIT

(71) Applicant: HUI BAO ENTERPRISE CO., LTD., Changhua County (TW)

(72) Inventor: Wan Pao Chen, Changhua County (TW)

(73) Assignee: Hui Bao Enterprise Co., Ltd., Changhua County (TW)

(*) Notice: Subject to any disclaimer, the term of this patent is extended or adjusted under 35 U.S.C. 154(b) by 78 days.

(21) Appl. No.: 14/560,204

(22) Filed: Dec. 4, 2014

(65) Prior Publication Data

US 2016/0161019 A1   Jun. 9, 2016

(51) Int. Cl.
| | |
|---|---|
| F16K 37/00 | (2006.01) |
| F16K 31/50 | (2006.01) |
| F16K 5/06 | (2006.01) |
| F16K 31/60 | (2006.01) |
| G05G 1/00 | (2006.01) |

(52) U.S. Cl.
CPC .............. *F16K 31/50* (2013.01); *F16K 5/0647* (2013.01); *F16K 31/60* (2013.01); *G05G 1/00* (2013.01)

(58) Field of Classification Search
CPC ........................................... F16K 5/06
USPC ............... 137/553, 315.4, 384.2, 384.6, 385; 251/297
See application file for complete search history.

(56) References Cited

U.S. PATENT DOCUMENTS

| | | | | |
|---|---|---|---|---|
| 937,774 A * | 10/1909 | Cunnings | ............. | G05D 16/163 137/489 |
| 1,165,026 A * | 12/1915 | Schreidt | ............. | F16K 37/0008 137/553 |
| 1,743,350 A * | 1/1930 | Hopkins | ................. | F16K 17/06 123/90.52 |
| 1,975,635 A * | 10/1934 | Dunham | ........................ | 137/553 |
| 2,166,875 A * | 7/1939 | Overbeke | ............. | F16K 11/074 137/625.11 |
| 2,591,514 A * | 4/1952 | Courtot | ..................... | F16K 3/26 251/297 |
| 2,610,024 A * | 9/1952 | Wirth | ........................ | F02D 9/00 251/297 |
| 3,593,549 A * | 7/1971 | Lakins | ............... | G05D 16/0636 137/383 |
| 3,874,478 A * | 4/1975 | Mantell, Jr. | ........ | F01M 11/0408 141/313 |
| 4,152,377 A * | 5/1979 | Takata | ..................... | F02M 1/10 137/383 |
| 4,231,544 A * | 11/1980 | Balch | ................. | F01M 11/0408 137/351 |
| 4,431,023 A * | 2/1984 | Johnson | ................ | F16K 17/162 137/316 |
| 4,512,547 A * | 4/1985 | Balch | .................... | F24D 19/088 251/115 |
| 4,742,848 A * | 5/1988 | Black | .................. | F16K 37/0016 137/556.3 |
| 5,228,646 A * | 7/1993 | Raines | .................. | A61M 39/22 251/322 |

* cited by examiner

Primary Examiner — Craig Schneider
Assistant Examiner — Angelisa L Hicks
(74) Attorney, Agent, or Firm — Rosenberg, Klein & Lee (57) ABSTRACT

A valve unit includes a valve body with a plate located in a tubular portion of the valve body. The tubular portion has multiple notches defined in the outside there. A knob has a space defined therein and is threadedly mounted to the tubular portion. The knob has a groove defined in the outside thereof. A first hole and a second hole are respectively defined through knob and communicate with the groove. A resilient member is engaged with the groove and two ends of the resilient member are respectively engaged with the first and second holes. A spring is biased between the plate and the knob. The contact portion is engaged with the notches to generate sounds when rotating the knob.

7 Claims, 11 Drawing Sheets

POSITIONING DEVICE FOR KNOB OF VALVE UNIT

BACKGROUND OF THE INVENTION

1. Fields of the Invention

The present invention relates to a valve unit (F16K-005/06), and more particularly, to a positioning device for a knob of the valve unit so that when rotating the knob, at least one sound is generated and the knob is well positioned.

2. Descriptions of Related Art

The conventional piping system for delivering fluid generally has at least one valve unit which is able to regulate the unit volume or pressure of the fluid in the piping system. A knob is located on outside of the valve unit and has an inner threaded portion so as to be connected to the outer threaded portion of the body of the valve. When rotating the knob, a plate in the valve unit can be moved to achieve the function of regulating the unit volume or pressure of the fluid in the piping system.

When finishing the regulation process, the knob has to be secured so as to prevent the knob from loosening.

Figure 10:
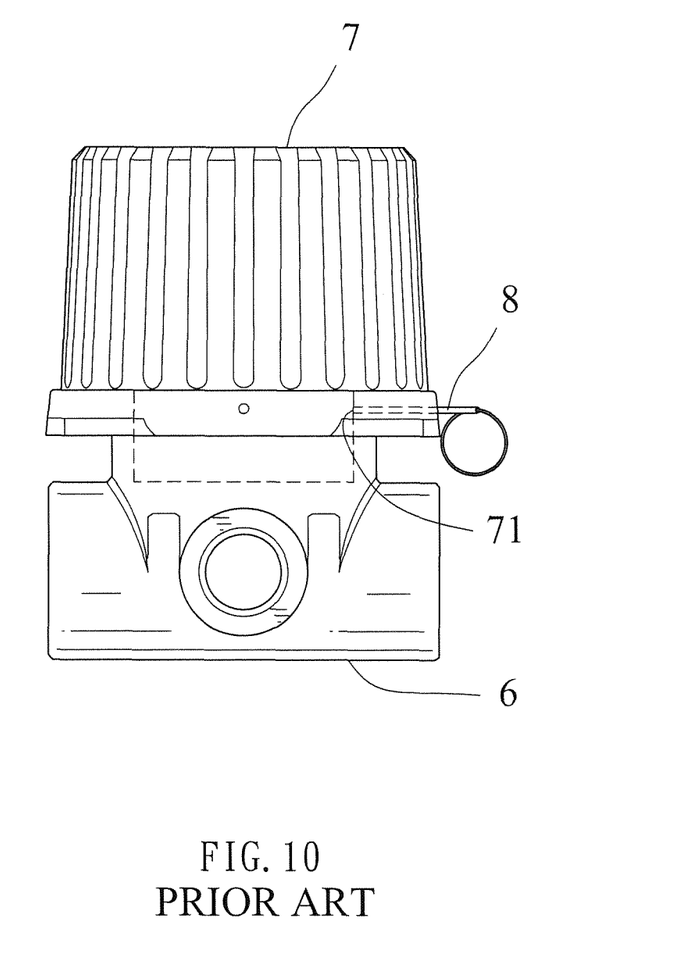
FIG. 10 shows the conventional valve unit.

As shown in FIG. 10, a conventional positioning device for a knob is disclosed and includes an external pin 8 which extends through the valve 6 and is inserted into one of the holes 61 of the knob 7, such that the knob 7 is well positioned.

Figure 11:
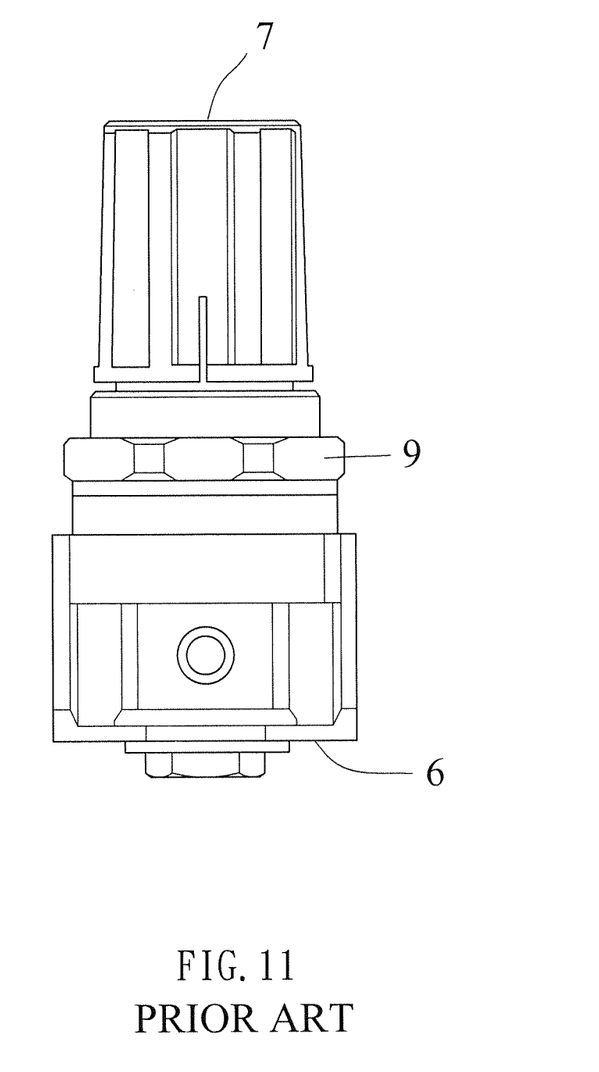
FIG. 11 shows another conventional valve unit.

As shown in FIG. 11, another conventional positioning device for a knob is disclosed, wherein the knob 7 has a nut 9 located at the underside thereof. The nut 9 is threadedly connected to the outer threaded portion of the valve 6. The nut 9 is securely connected to the knob 7 by using a wrench to tighten the nut 9, such that the knob 7 is well positioned.

However, the external pin 8 protrudes outward, and the nut 9 has to be tightened by using a wrench. These conventional ways are not convenient.

The present invention intends to provide a positioning device for a knob of the valve unit so as to eliminate the shortcomings mentioned above.

SUMMARY OF THE INVENTION

The present invention relates to a valve unit and comprises a valve body connected with a pipe and having a tubular portion extending therefrom. A plate is located in the tubular portion which has an outer threaded portion. Multiple notches are defined in the outside of the tubular portion and located below the outer threaded portion. A knob has a space defined therein. An inner threaded portion is defined in the inner periphery of the space. The knob has a groove defined in the outside thereof, and a first hole and a second hole are respectively defined through knob and communicate with the groove. A resilient member is a bent wire and has a hook and a contact portion formed on two ends thereof. The hook is engaged with the first hole, and the contact portion is engaged with the second hole. A spring has a first end contacting the plate, and a second end of the spring contacts the inner end of the space of the knob.

Preferably, a stop is located in the second hole and the groove.

Preferably, a first positioning portion is formed at the inner end of the space of the knob, and the second end of the spring is engaged with the first positioning portion.

Preferably, the plate has a second positioning portion extending from the top thereof. The first end of the spring is mounted to the second positioning portion.

Preferably, the notches comprise first notches and second notches. The lengths of the first notches are the same. The second notches have different lengths.

Preferably, the gap between the first notches is smaller than the gap between the second notches.

Preferably, the resilient member is bent from a straight wire. The first end of the straight wire is bent to form the hook, and the second end of the straight wire is bent to have the contact portion.

The primary object of the present invention is to provide a knob for a valve unit, wherein the user does not need any tool to tighten the knob.

Another object of the present invention is to provide a knob for a valve unit, when rotating the knob, sounds are generated to acknowledge the user by engaging the contact portion of the resilient member with the notches.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
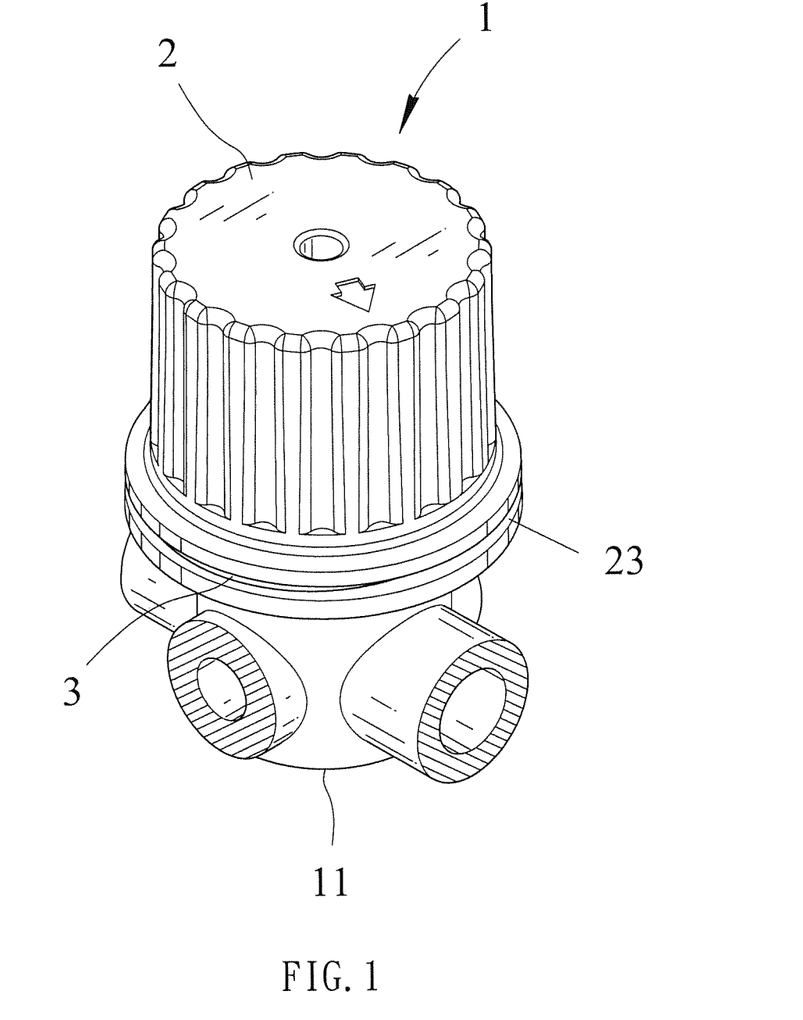
FIG. 1 is a perspective view to show the valve unit of the present invention.
Figure 2:
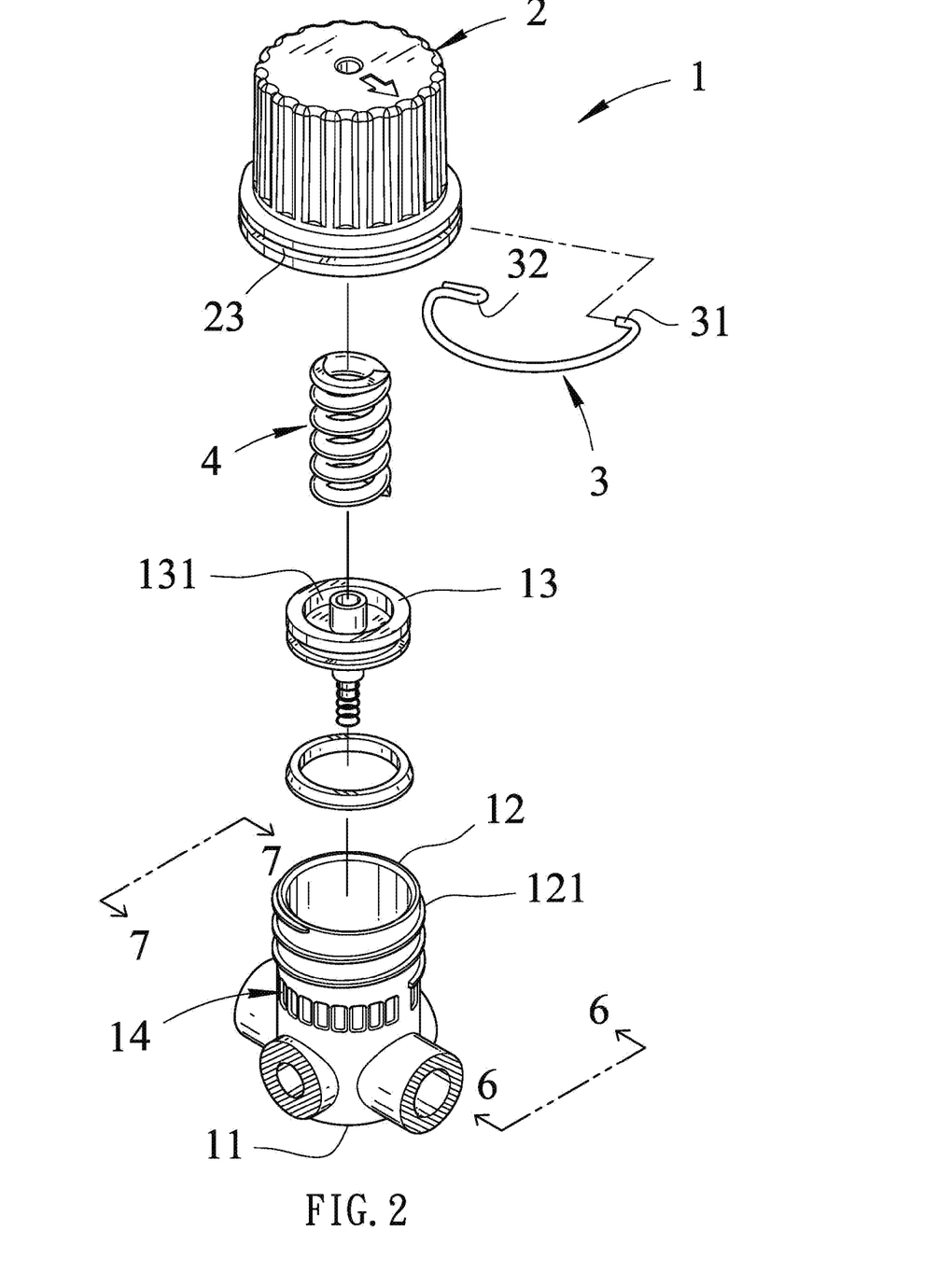
FIG. 2 is an exploded view of the valve unit of the present invention.
Figure 3:
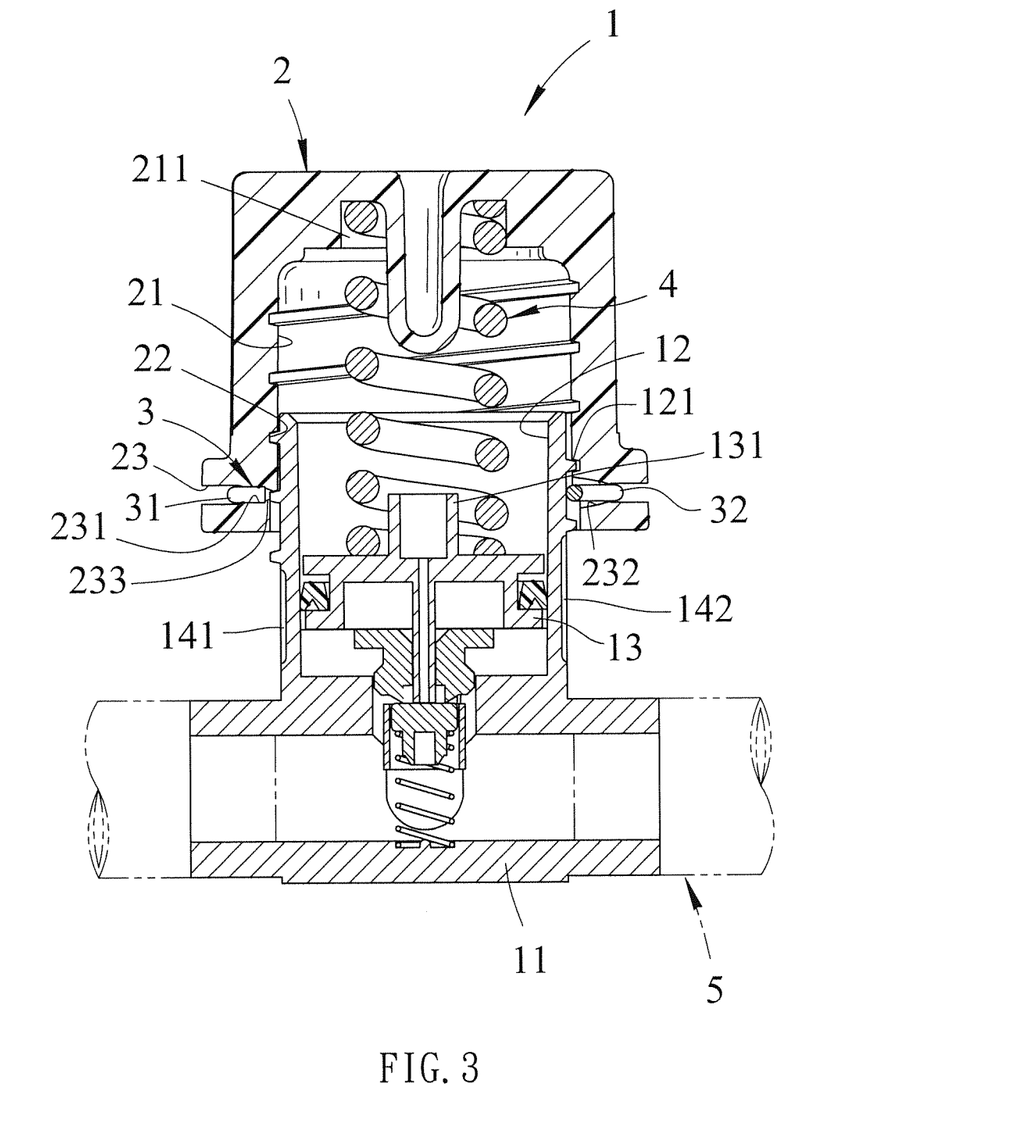
FIG. 3 is a cross sectional view of the valve unit of the present invention.
Figure 4:
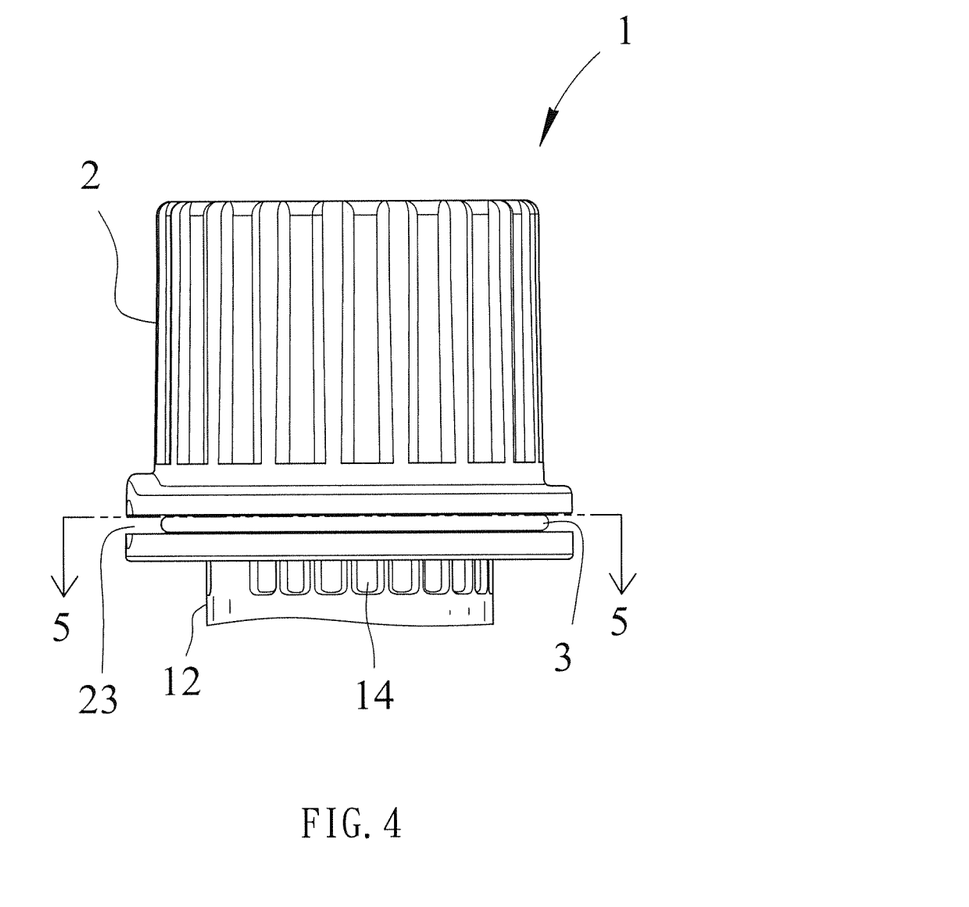
FIG. 4 shows that the knob and the positioning member of the valve unit of the present invention.
Figure 5:
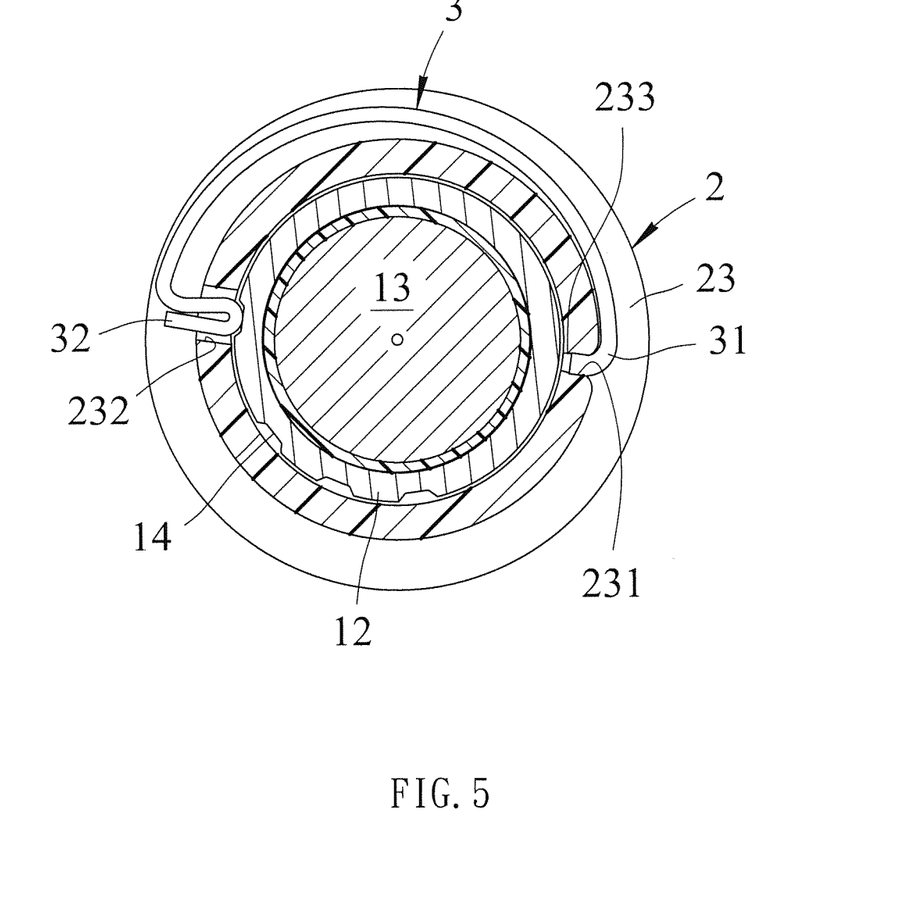
FIG. 5 is a cross sectional view taken along line 5-5 in FIG. 4.
Figure 6:
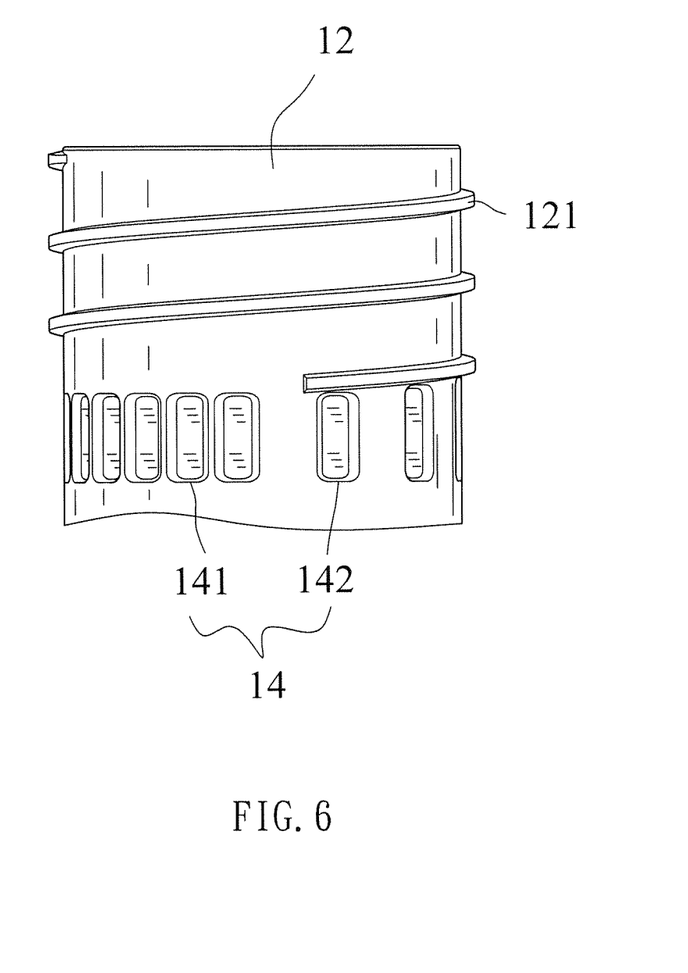
FIG. 6 shows the arrangement of the first and second notches of the knob.
Figure 7:
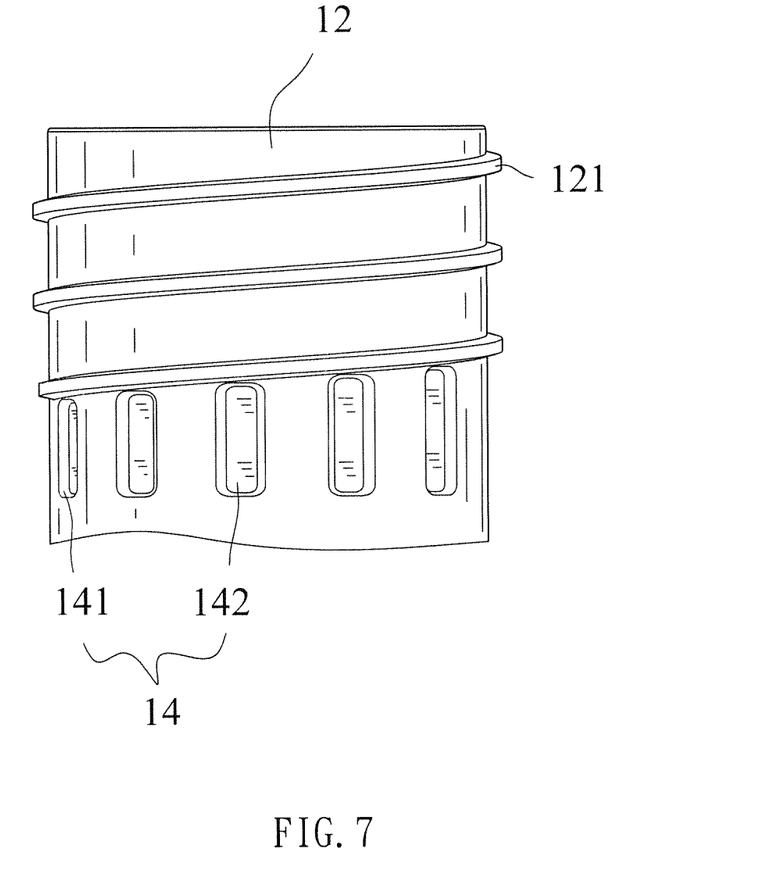
FIG. 7 shows the arrangement of the second notches of the knob.
Figure 8:
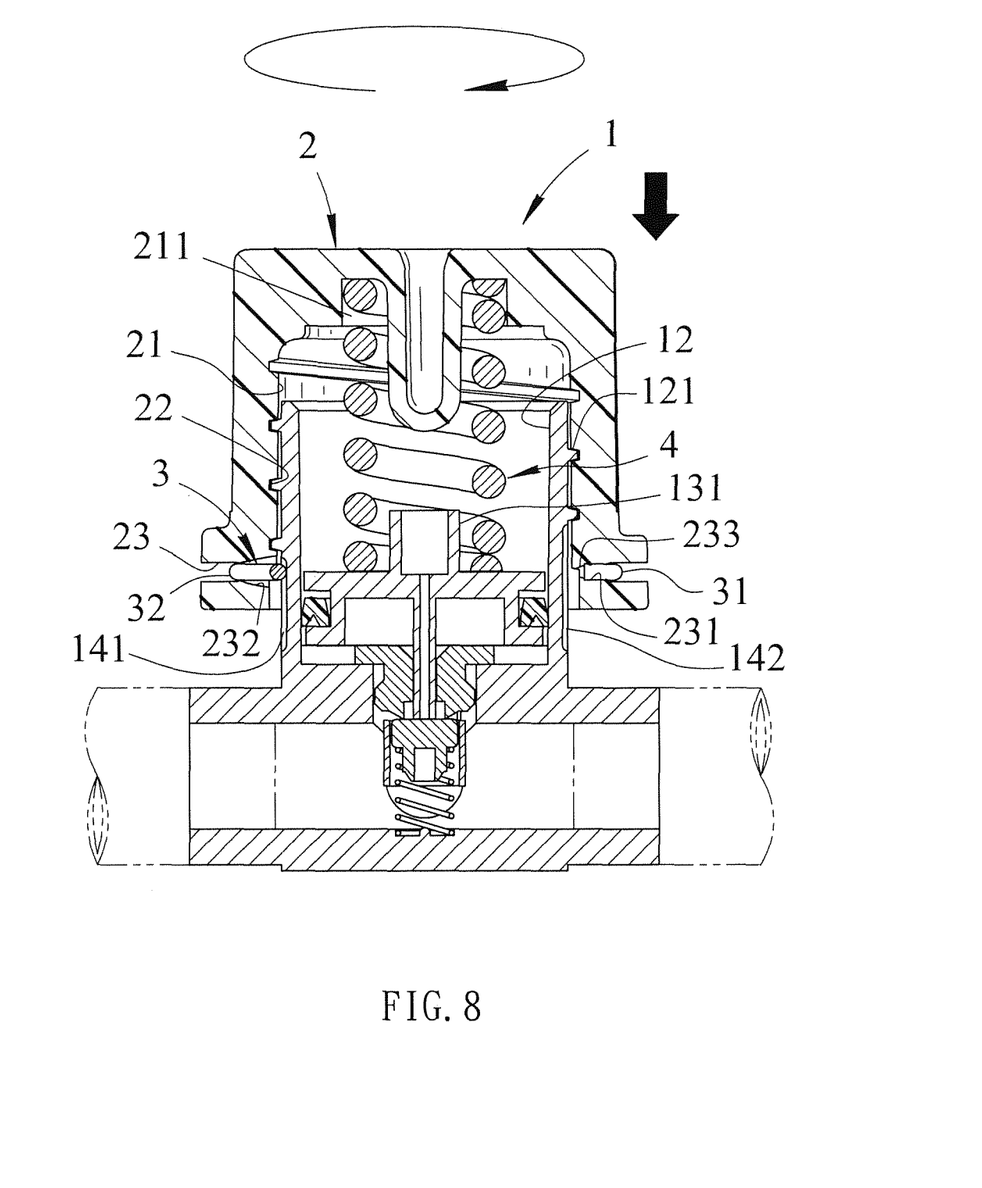
FIG. 8 is a cross sectional view to show that the knob is rotated.

Referring to FIGS. 1 to 5, the valve unit 1 of the present invention comprises a valve body 11 connected with a pipe 5, and the valve body 11 has a tubular portion 12 extending therefrom. A plate 13 is located in the tubular portion 12. The tubular portion 12 has an outer threaded portion 121. Multiple notches 14 are defined in the outside of the tubular portion 12 and located below the outer threaded portion 121 as shown in FIG. 4. As shown in FIGS. 6 and 7, the notches 14 comprise first notches 141 and second notches 142, wherein the lengths of the first notches 141 are the same, and the second notches 142 have different lengths. The gap between the first notches 141 is smaller than the gap between the second notches 142.

A knob 2 has a space 21 defined therein. An inner threaded portion 22 is defined in the inner periphery of the space 21 so as to be threadedly connected to the outer threaded portion 121 of the tubular portion 12. The knob 2 has a groove 23 defined externally thereon, and a first hole 231 and a second hole 232 are respectively defined through knob 2 and communicate with the groove 23. Generally, the second hole 232 is larger than the first hole 231. A resilient member 3, as shown in FIGS. 2 and 5, is a bent wire and has a hook 31 and a contact portion 32 formed on two ends thereof. The hook 31 is engaged with the first hole 231, and the contact portion 32 is engaged with the second hole 232. The engagement between the resilient member 3 and the groove 23 ensures that the resilient member 3 is not disengaged from the groove 23. A stop 233 is located in the first hole 231 and the groove 23 to avoid the hook 31 of the resilient member 3 from being exposed and also avoid the hook 31 from interfering with the outside of the tubular portion 12.

A spring 4 has a first end contacting the plate 13, and a second end of the spring 4 contacts the inner end of the space 21 of the knob 2. In detail, a first positioning portion 211 is formed at the inner end of the space 21 of the knob 2, and the second end of the spring 4 is engaged with the first positioning portion 211. The plate 13 has a second positioning portion 131 extending from the top thereof. The first end of the spring 4 is mounted to the second positioning portion 131.

As shown in FIGS. 5 to 8, the first notches 141 and second notches 142 are defined on the outside of the tubular portion 12 and located below the outer threaded portion 121 of the tubular portion 12. The resilient member 3 is engaged with the groove 23, the contact portion 32 extends through the second hole 232 so that when the knob 2, the spring 4 and plate 13 are installed to the tubular portion 12, the contact portion 32 is engaged with one of the notches 14.

By the engagement between the outer threaded portion 121 of the valve body 11 and the inner threaded portion 22 of the knob 2, when rotating the knob 5 to adjust the unit volume or pressure of the fluid in the pipe 5, the resilient member 3 is moved upward or downward, and the contact portion 32 moves over the notches 14 so as to generate sounds which acknowledge the user the status of the operation of the knob 2.

Because the gaps and the lengths of the second notches 142 of the tubular portion 12, when the knob 2 starts to be rotated, the knob 2 can quickly move toward the final stage of the rotation. When the knob 2 moves to the position wherein the first notches 141 are located, because the gaps are narrower, so that the knob 2 is able to be rotated more precisely.

Figure 9:
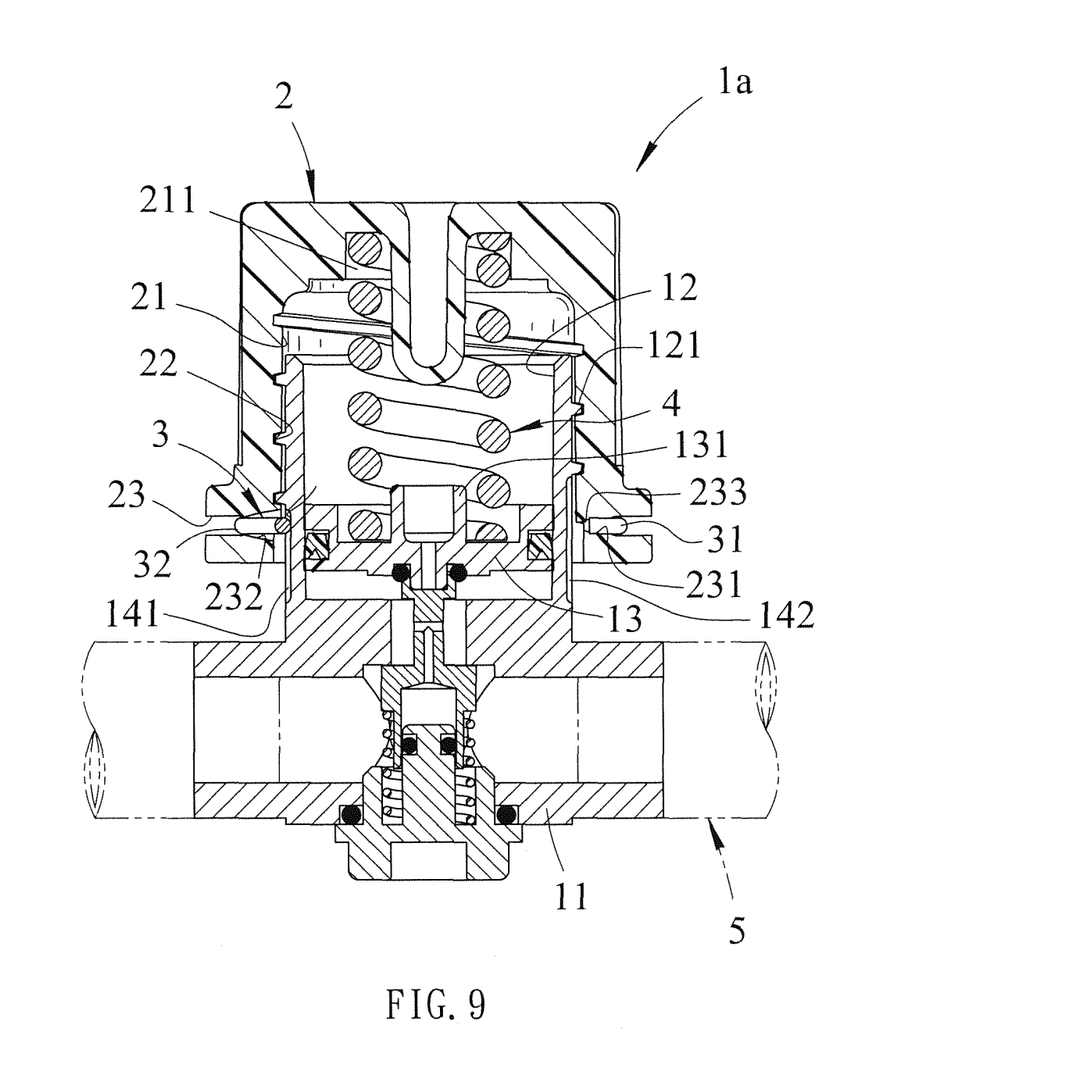
FIG. 9 is a cross sectional view to show another embodiment of the valve unit of the present invention.

The above described parts and operations can be used for both the valve units 1, 1a shown in FIGS. 3 and 9.

While we have shown and described the embodiment in accordance with the present invention, it should be clear to those skilled in the art that further embodiments may be made without departing from the scope of the present invention.

What is claimed is:

1. A valve unit comprising:
   a valve body connected with a pipe and having a tubular portion extending therefrom, a plate located in the tubular portion, the tubular portion having an outer threaded portion, multiple notches defined outside of the tubular portion and located adjacent the outer threaded portion;
   a knob having a space defined therein, an inner threaded portion defined in an inner periphery of the space, the knob having a groove defined externally thereon, a first hole and a second hole respectively defined through knob and communicating with the groove;
   a resilient member being a bent wire and having a hook and a contact portion formed on two ends of the resilient member, the hook engaged with the first hole, the contact portion engaged with the second hole, and
   a spring having a first end contacting the plate, a second end of the spring contacting an inner end of the space of the knob;
   wherein a stop is located in the second hole and the groove.

2. The valve unit as claimed in claim 1, wherein a first positioning portion is formed at the inner end of the space of the knob, the second end of the spring is engaged with the first positioning portion.

3. The valve unit as claimed in claim 1, wherein the plate has a second positioning portion extending from a top thereof, the first end of the spring is mounted to the second positioning portion.

4. The valve unit as claimed in claim 1, wherein the resilient member is bent from a straight wire, a first end of the straight wire is bent to form the hook, a second end of the straight wire is bent to have a U-shaped contact portion.

5. A valve unit comprising:
   a valve body connected with a pipe and having a tubular portion extending therefrom, a plate located in the tubular portion, the tubular portion having an outer threaded portion, multiple notches defined outside of the tubular portion and located adjacent the outer threaded portion;
   a knob having a space defined therein, an inner threaded portion defined in an inner periphery of the space, the knob having a groove defined externally thereon, a first hole and a second hole respectively defined through knob and communicating with the groove;
   a resilient member being a bent wire and having a hook and a contact portion formed on two ends of the resilient member, the hook engaged with the first hole, the contact portion engaged with the second hole, and
   a spring having a first end contacting the plate, a second end of the spring contacting an inner end of the space of the knob;
   wherein the notches include first notches and second notches, lengths of the first notches are the same, the second notches have different lengths.

6. The valve unit as claimed in claim 5, wherein a stop is located in the second hole and the groove.

7. The valve unit as claimed in claim 5, wherein a gap between the first notches is smaller than a gap between the second notches.

* * * * *